United States Patent
Emanuel et al.

(10) Patent No.: US 9,870,351 B2
(45) Date of Patent: Jan. 16, 2018

(54) ANNOTATING EMBEDDED TABLES

(71) Applicant: International Business Machines Corporation, Armonk, NY (US)

(72) Inventors: Barton W. Emanuel, Manassas, VA (US); Martin N. Saunders, Crowthorne (GB); Adam F. Severino, Bankstown (AU); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/863,829

(22) Filed: Sep. 24, 2015

(65) Prior Publication Data

US 2017/0091162 A1 Mar. 30, 2017

(51) Int. Cl.
*G06F 17/27* (2006.01)
*G06F 17/24* (2006.01)

(52) U.S. Cl.
CPC .................................. *G06F 17/241* (2013.01)

(58) Field of Classification Search
CPC ................................................ G06F 17/30914
USPC ... 704/1–10, 250, 251, 255, 257, 270, 270.1
See application file for complete search history.

(56) References Cited

U.S. PATENT DOCUMENTS

| | | | |
|---|---|---|---|
| 7,350,141 B2 | 3/2008 | Kotler et al. | |
| 7,590,647 B2 | 9/2009 | Srinivasan et al. | |
| 8,977,953 B1* | 3/2015 | Pierre | G06F 17/2785 |
| | | | 715/201 |
| 2006/0285772 A1* | 12/2006 | Hull | G06F 17/30247 |
| | | | 382/305 |
| 2011/0311140 A1* | 12/2011 | Urbach | G06K 9/00664 |
| | | | 382/182 |
| 2013/0205202 A1* | 8/2013 | Xiao | G06F 17/2264 |
| | | | 715/249 |
| 2014/0164899 A1* | 6/2014 | Emanuel | G06F 17/241 |
| | | | 715/230 |
| 2014/0280008 A1* | 9/2014 | Boudreau | G06F 17/30734 |
| | | | 707/708 |
| 2015/0026556 A1 | 1/2015 | Stadermann et al. | |
| 2015/0067468 A1* | 3/2015 | Emanuel | G06F 17/2211 |
| | | | 715/231 |
| 2015/0142419 A1* | 5/2015 | Edwards | G06F 17/2785 |
| | | | 704/9 |
| 2015/0356198 A1* | 12/2015 | D'Souza | G06F 17/30914 |
| | | | 705/2 |

OTHER PUBLICATIONS

"A System for Detecting, & Extracting Data From, Tables in Text Based Documents"; An IP.com Prior Art Database Technical Disclosure; IP.com No. 000219454; Jul. 2, 2012; pp. 1-2.

* cited by examiner

*Primary Examiner* — Huyen Vo
(74) *Attorney, Agent, or Firm* — Alexa L. Ashworth; A. Imtiaz Billah

(57) ABSTRACT

Embodiments of the present invention provide systems and methods for extracting and annotating text. Heuristics are applied to extracted text data in order to detect the readability of the text data. The text data is converted to an intermediate form. The transformed intermediate form is converted back to the original text format. Character and feature correspondence; positional logic; and queries to determine if the text data within a line corresponds with a token header are used to maintain the formatting and annotate the original text.

15 Claims, 7 Drawing Sheets

| ROW | PITCH | SHAPE | PRICE | STOCK |
|-----|-------|-------|-------|-------|
| M4 | 0.7 | PAN | 10 | 376 |
| M5 | 0.8 | ROUND | 13.59 | 502 |
| M6 | 1 | BOTTOM | 10.5 | 465 |
| M8 | 1.25 | PAN | 12 | 1091 |
| M10 | 1.50 | ROUND | 16.69 | 562 |

ROW: bottom=96 left=5 right=48 top=72
PITCH: bottom=95 left=152 right=225 top=72
SHAPE: bottom=94 left=328 right=405 top=71
PRICE: bottom=95 left=515 right=594 top=71
STOCK: bottom=95 left=755 right=835 top=72

FIG. 5

```
TableCell
  Type = TitlecaseAlphabetic
  Value = Pan
  Lemma = pan
  Part Of Speech = Noun (Common)
  Length = 3
  Dictionary Match = true
  Row = 1
  Column = 2
  Row Heading = M4
  Column Heading = Shape
  DocumentOffset = 1874
```
~ 705

ANNOTATING EMBEDDED TABLES

BACKGROUND OF THE INVENTION

The present invention relates generally to the field of data processing, and more specifically to annotating embedded tables for text analytics.

Text analytics systems extract free text from a whole range of different document formats (e.g., plain text, Word, PDF). The extracted text may be treated as a sequence of bytes which are analyzed by the text analytics components. During the extraction process, critical elements such as tabulation or any proprietary tags within the source document type (e.g., PDF) are often lost. This results in the extracted text losing its formatting when it is reintroduced into another document format.

SUMMARY

According to one embodiment of the present invention, a method for extracting and annotating text is provided, the method comprising the steps of: extracting, by one or more processors, text data from a first source wherein the text data comprises a stream of characters in a first text format; applying, by one or more processors, heuristics to the extracted text data from the first source, wherein the heuristics detect readability of the text data; encoding, by one or more processors, the text data into a second text format; and transforming, by one or more processors, the second text format into annotations with the first text format.

Another embodiment of the present invention provides a computer program product for extracting and annotating text, based on the method described above.

Another embodiment of the present invention provides a computer system for extracting and annotating text, based on the method described above.

BRIEF DESCRIPTION OF THE DRAWINGS

FIG. 5 is an example of coordinates extracted from a matrix, in accordance with an embodiment of the present invention;

FIG. 7 is an example of metadata fields converted to annotations to be analyzed by a text analytics system, in accordance with an embodiment of the present invention.

DETAILED DESCRIPTION

Extraction of table data via either API or OCR/ICR often gets transformed to unformatted text. Unformatted text is not well-suited for downstream formatting. Embodiments of the present invention provide systems and method for extracting and annotating tables so that the resulting annotations can be used with text analytics, content analytics systems, and general search systems. The application of heuristics determines field types, orientation, and semantics. The encoding of the table data preserves positional and contextual information. The encoded table is transformed to a set of annotations for the target text analytics system or indexing system. These steps ensure a consistent input of source text from a tokenizer, which will be correctly and consistently interpreted for further processing.

Figure 1:
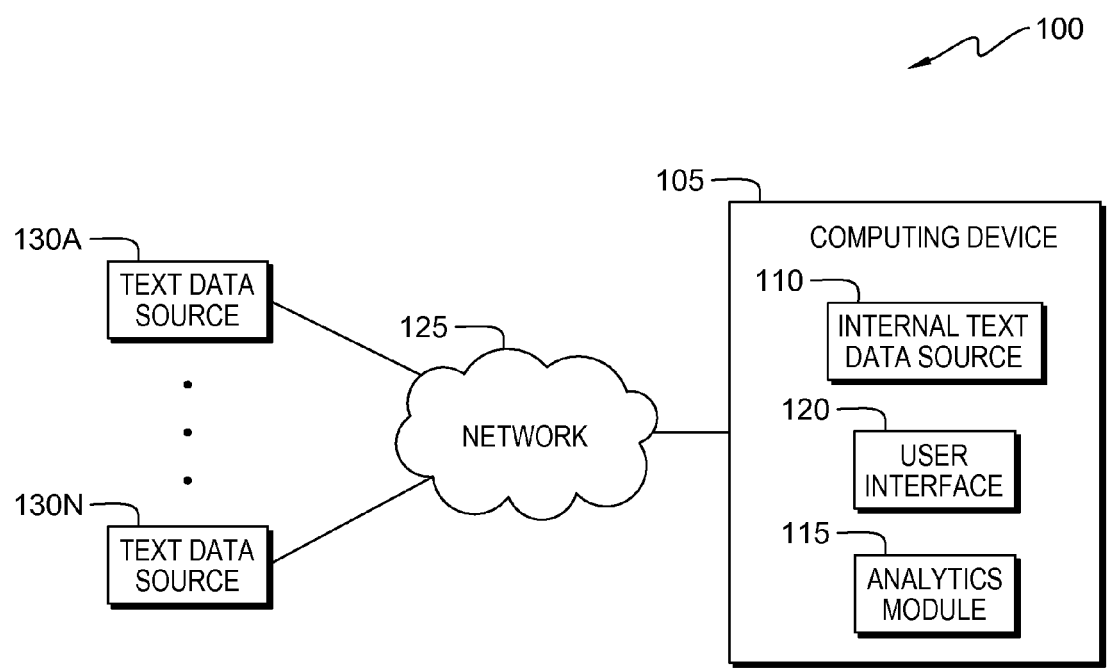
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes text data source 130A-N, and computing device 105, interconnected via network 125. N may equal 2 or a higher number depending on the number of text data sources which are not located on computing device 105 and are connected to network 125.

Network 125 can be, for example, a local area network (LAN), a wide area network (WAN) such as the Internet, or a combination of the two, and can include wired, wireless, or fiber optic connections. In general, network 125 can be any combination of connections and protocols that will support communication between computing device 105 and text data sources 130A-N.

Text data sources 130A-N are electronic forms of data in text form. Text data sources may include (but are not limited to) data in PDF, Word, and Excel forms. Text data sources 130A-N can communicate with any additional programmable electronic devices not pictured in FIG. 1 via network 125. Text data sources 130A-N may be located on its own computing device. Data processing environment 100 may include any number of text data sources that can be supported by the system.

Computing device 105 includes internal text data source 110, analytics module 115, and user interface 120. Computing device 105 may be a laptop computer, a tablet computer, a netbook computer, a personal computer (PC), a desktop computer, a personal digital assistant (PDA), a smart phone, a thin client, or any programmable electronic device capable of communicating with text data sources 130A-N via network 125. Computing device 105 may include internal and external hardware components, as depicted and described in further detail with respect to FIG. 8.

User interface 120 may be for example, a graphical user interface (GUI) or a web user interface (WUI) and can display text, documents, web browser windows, user options, application interfaces, and instructions for operation, and includes the information (such as graphics, text, and sound) a program presents to a user and the control sequences the user employs to control the program. User interface 120 is capable of receiving data, user commands, and data input modifications. User interface 120 is also capable of communicating with analytics module 115. In some embodiments, user interface 120 may be integrated with analytics module 115.

In this exemplary embodiment, analytics module 115 is an application capable of annotating text via text analytics. Analytics module 115 compiles the information extracted from a text data source. The text data source includes (but is not limited to) data in PDF, Word, and Excel format. The text data source can be located internally (i.e., internal text data source 110) and/or externally (i.e., text data sources 130A-N). In other embodiments, multiple internal text data sources may be present. Algorithms are used by analytics module 115 to determine the readability of text amenable for human detection, positioning of text, tokenizing text, and validation of text to properly annotate the text. The text data is treated as discrete points which are typically amenable to human utterance methodology. Human utterances consist of an action (a verb) with a recipient of the action (an object) and optionally the subject who performs that action. The combination of these three elements (a verb, an object, and a subject) is triple based data.

Figure 2:
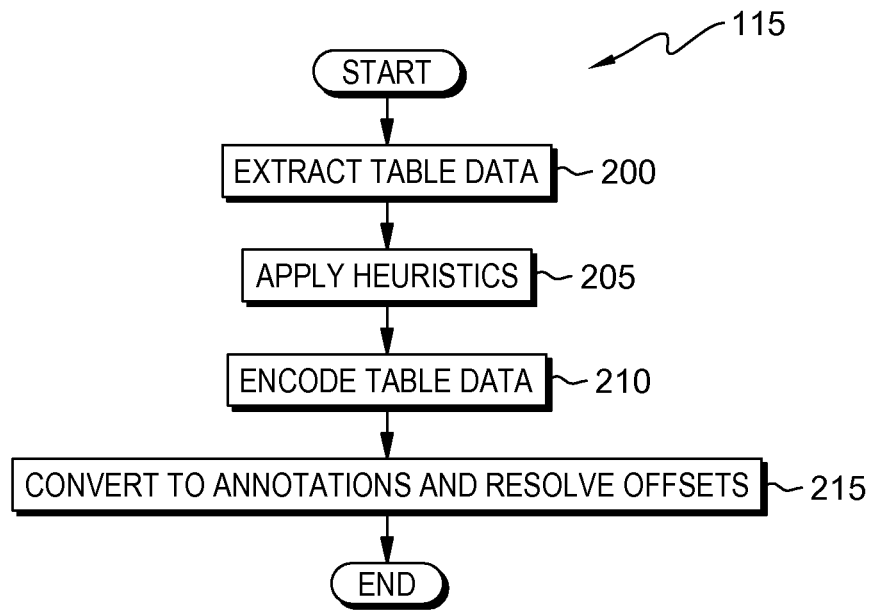
FIG. 2 is a flowchart depicting the operational steps for extracting and annotating tables, in accordance with an embodiment of the present invention.

FIG. 2 is a flowchart depicting the operational steps for extracting and annotating tables, in accordance with an embodiment of the present invention.

In step 200, analytics module 115 extracts table data. In this exemplary embodiment, extraction of table data is undertaken using Application Programming Interface (API). The table data is often in text format. API is a set of routines, protocols, and tools for building software. For example, an API permits the copying of data from one application and the pasting of the data in another application within Windows. In some embodiments, tables are extracted using optical character recognition (OCR) technology to convert input documents to text as a stream of characters with additional positional information (e.g., x, y, z coordinates or top, bottom, left, right coordinates on a page).

In step 205, analytics module 115 applies heuristics. A heuristic is a technique designed for solving a problem more quickly when classic methods are too slow or for finding an approximate solution when classic methods fail to find any exact solution. The speed achieved by heuristics is obtained at the expense of optimality, completeness, accuracy, or precision. In this exemplary embodiment, analytics module 115 utilizes heuristics to determine field types, orientation, and semantics (i.e., the meaning of languages) of text data. Specific heuristics applied by analytics module 115 are described in more detail with respect to FIG. 3.

In step 210, analytics module 115 encodes table data. In this exemplary embodiment, extracted tables are encoded into an intermediate format (e.g., XML or JSON) along with the offset information of the rows, columns, and/or fields. The encoded tables are placed into metadata fields. The actual offset of the original cells is stored with the table values. In some embodiments, the tables may also be encoded in RDF to support inference. Encoding is the process of putting a sequence of characters (letters, numbers, punctuation, and certain symbols) into a specialized format for efficient transmission or storage. Conversely, decoding is the conversion of an encoded format back into the original sequence of characters. Encoding and decoding are used in data communications, networking, and storage.

In step 215, analytics module 115 converts encoded table data to annotations and resolve offsets. In this exemplary embodiment, the encoded table data (which is in a special format) is decoded (i.e., transforming encoded table data). At the text analytics processing stage, the metadata fields are converted to annotations, available to the text analytics system. Table related metadata becomes annotation features in the target text analytics system. At the end of the annotation stage, the DocumentOffset feature is substituted for the actual offset of the encoded table cell to allow proper highlighting of the text for visualizations, etc. The transformation carried out by analytics module 115 maintains formatting of the original table data. The resulting annotation is available for downstream text analytics. The methods and techniques by which extracted text and transformed encoded data match with the original formatting is discussed with respect to FIG. 3.

Figure 3:
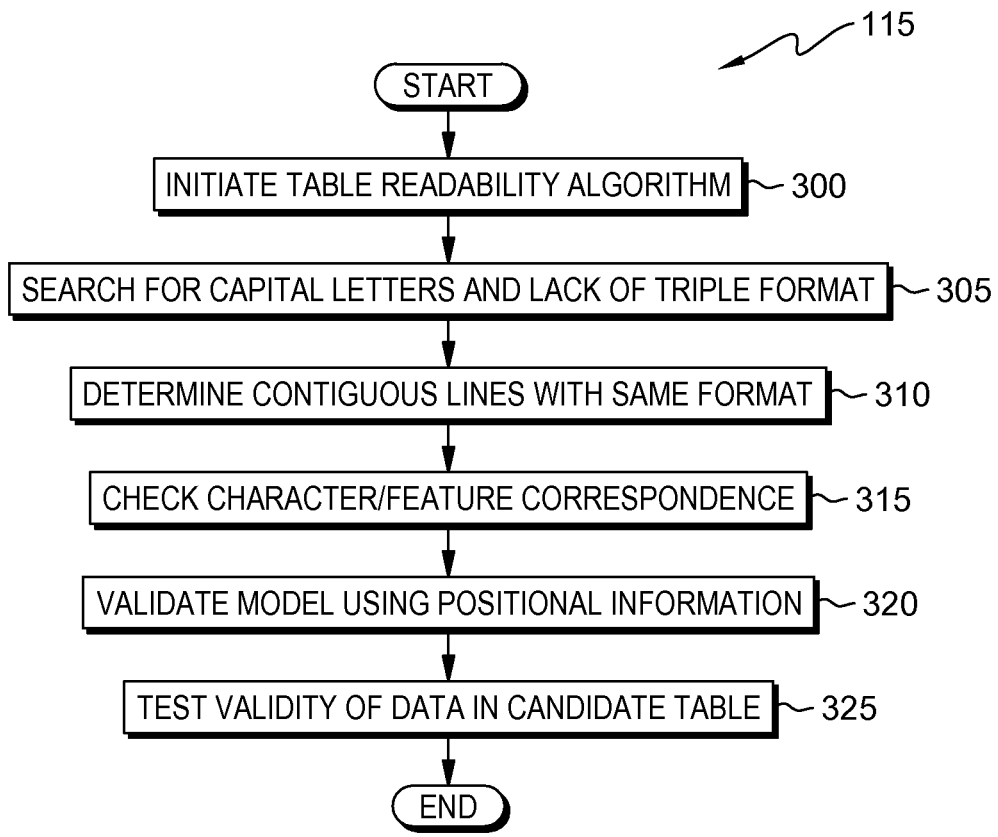
FIG. 3 is a flowchart depicting the operational steps for creating annotations and resolving offsets, in accordance with an embodiment of the present invention.

FIG. 3 is a flowchart depicting the operational steps for assessing and validating readability of table data, in accordance with an embodiment of the present invention.

In step 300, analytics module 115 initiates a table readability algorithm. The table readability algorithm is initiated upon receiving text. Readability issues regarding text content in sentence is taken into account such as capital letters, lack of triple format, and text formatting. In other words, the text content should be readily decipherable to an individual looking at the text content In step 305, analytics module 115 searches for capital letters and lack of triple format. In this exemplary embodiment, pseudo-logic utilized by analytics module 115 looks for capitalized letters and data in triple format within the received text. A line of text which does not include data in triple format is not necessarily indicative of table data. Analytics module 115 prefers data which is not in triple format and determines if the data is triple format or not. The table data is encoded to preserve positional and contextual information. By parsing text through a single interface, analytics module 115 searches for, and finds triples. Triple based data is a three-component based regime consisting of an action, an object, and a subject. Data points are discrete in nature in a table, and do not operate with data in triple format. Thus, analytics module 115 is able to extract and annotate discrete data points in table form, and pass over data in triple format.

In step 310, analytics module 115 determines contiguous lines with the same format. In this exemplary embodiment, analytics module 115 searches for contiguous lines with the same format. Contiguous lines with the same format can be indicative of text or other types of data in tabular form.

In step 315, analytics module 115 checks for character/feature correspondence. A table is examined by analytics module 115 to find the character/feature correspondence by checking if an nth-token on line x has a character-feature correspondence to the n+1th token on line x+1. Tokenization is the process of breaking a stream of text into meaningful elements called tokens. Tokens represent a lexeme which explicitly indicates its categorization for the purpose of parsing. Tokenization is described in more detail with respect to FIG. 4.

In step 320, analytics module 115 validates the model (i.e., the received text) using positional information. Positional information may be available from extracted table data. This may be used in order to validate the model and further increase the confidence. This step in described in further detail with respect to FIG. 6.

In step 325, analytics module 115 tests the validity of data in the created candidate table. The separation of extracted text from text annotation involves converting text into an intermediate format such as XML or JSON. The intermediate format is added to the end of a text or stuffed into a field. Text analytics will then take those structures at the end of the text or stuffed into a field in order to produce annotations with features for the table elements, rows, columns, and headers, and calculations of proper offsets from the original text. Additional analytics may be applied to map the index fields and/or facets. Resolving offsets into the original text are undertaken so that highlighted annotations work properly. Instances where proper annotation, resolution of offsets, and formatting are maintained, delimitation is applied in consistent segments of the source text. The delimitation make take the form of commas, tabs and/or other punctuation. Delimitation aims to provide a consistent input of source text data which permits a tokenizer to correctly and consistently interpret the source text data for further processing. In other embodiments, Supervised machine learning (sML) techniques are employed by analytics module 115.

Figure 4:
FIG. 4 is an example of a matrix which implements tokenization and corresponding lines, in accordance with an embodiment of the present invention.

FIG. 4 is an example of a matrix which implements tokenization and corresponding lines, in accordance with an embodiment of the present invention.

In this exemplary embodiment, a matrix of tabulated data is depicted. The columns are labelled using letters A through E. The rows are labelled using numbers 1 to 6. An entry is described in terms of its column letter and row number. For example, entry A1 has the word "Row" in it. Tokens can be header categories. In this exemplary embodiment, entry A1 is type of token describing the "Row" header category. Entries B1, C1, D1, and E1 are the "Pitch", "Step", "Price", and "Stock" header categories, respectively. Going down a column associated with a header categories, items/data associated with the header categories are described.

In this exemplary embodiment, tokens are described in terms of n+y and the corresponding lines are described in terms of x+y. For the purpose of this disclosure, token boxes T1, T2, T3, T4, T5, and T6 are associated with corresponding line boxes C1, C2, C3, C4, C5, and C6, respectively, which share similar feature sets (e.g., float data type). Header categories (entries A1, B1, C1, D1, and E1) are taken into account by assigning the variable n0. The value of n0 is the token in the header. Differences in feature sets between the variable n0 and variables n+y are overlooked. Instead, analytics module 115 focuses on n+y terms where y=0, 1, 2, 3, etc. For example, entry B1 is a header category which has n0 value of "Pitch" and thus B1 is not given a n+y term and B1 is depicted as not having a token box (T1-T6) with it. To test the validity of the data that is in a table, we take the $n^{th}$ token from each line starting at line x+0 (to avoid conflict with potential headers) and we construct natural language generation (NLG) queries to determine if "n+y" is an "n0"?

NLG is a validation analytic. The value at n0 is the token in the header, and the value at n+y is the value at a given point in the hypothetical table. For example, the text is extracted from matrix depicted in FIG. 4 and the text entry "pan" is considered a shape. There are already known Natural Language patterns capable of answering queries (is "pan" a "shape"?) by parsing natural language. NLG techniques applied on table data finds answers (or lack of answers) within the document. If answers are found, this increases the model confidence that analytics module 115 is dealing with an actual table. If answers are not, this decreases the model confidence that analytics module 115 is dealing with an actual table. Queries using NLG consider text and punctuation.

For example, the matrix has "562" in entry E6 and NLG can construct a query to determine if "562" is a price:

"[0-9]+(\\.[0-9]+)? is-a price"

In the matrix depicted, "562" in entry E6 is not under the heading "price" but under the heading "stock" and thus "562" is not a price.

FIG. 5 is an example of coordinates extracted from a matrix, in accordance with an embodiment of the present invention.

In this exemplary embodiment, tokens (n+0 and n+1) on corresponding lines (x+0 and x+1) share similar feature sets (e.g., float data type). Headers which are defined as n0 are overlooked. Tokens and lines contain n+y and x+y, where y=0, 1, 2, and other integer values. When positional information available from tables is extracted using document format specific APIs which may be used by NLG to validate the model and further increase the confidence. For example, tokens are highlighted in line 500. These tokens are encoded as having the coordinates depicted in box 505. The left and right values can be tested to verify queries to determine if something is within the range of the "Shape" column and outside the ranges of "Pitch" and "Price". For example, token "Pan" in line 500 has a particular set of coordinates. The left and right values can be tested to verify it is in the range of values of the "Shape" column and outside the ranges of values of the "Pitch" and "Price" columns.

Figure 6:
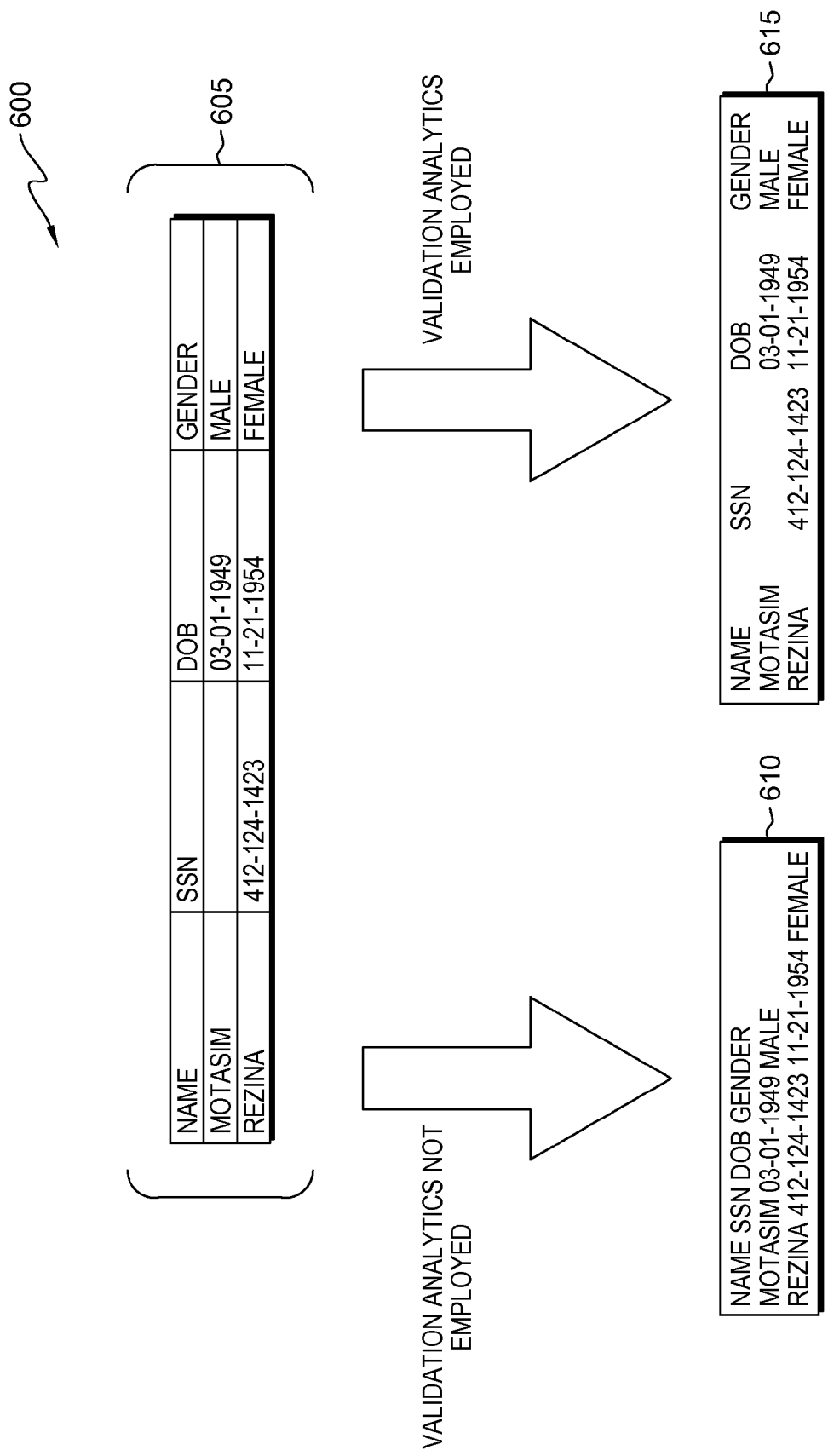
FIG. 6 is an example of extracted text which did not employ validation and/or positioning logic, in accordance with an embodiment of the present invention.

FIG. 6 is an example of a correction of sparsely populated tables, where the extracted text did not employ validation and/or positioning logic, in accordance with an embodiment of the present invention.

In this exemplary embodiment, extracted text does not employ the validation analytics, such as NLG. Validation analytics allow for the correction of sparsely populated tables when text extraction cannot recognize there are missing values. The text data in table 605 is in tabular format. The copied text data from table 605 is pasted as box 610. The formatting is lost as depicted in box 610. Formatting is maintained as depicted in box 615 when positioning logic is applied. The methods and techniques of analytics module 115 are not being applied. Thus, data entries in the tokens and the corresponding lines are not going to be considered. The token "Male" in line 2 is not the same type as the token "11-21-1954" in line 3 in table 605. Without the validation analytics, the token "Male" and token "11-21-1954" are not properly associated with the correct header. A positional logic identifies potential missing values and allows the validation algorithm in analytics module 115 to be applied to the appropriate tokens. Thus, the entry of "Male" is checked against "Gender" and not against "DOB" as the uncorrected extracted text would suggest in box 610.

In this exemplary embodiment, extracted text employs the validation analytics. Validation analytics allow for the correction of sparsely populated tables when text extraction cannot recognize there are missing values. Thus, copied text data from table 605 is pasted as box 615. For example, validation analytics associates the token "Male" and the token "11-21-1954" with the correct header. Positional logic identifies potential missing values and allows the validation algorithm in analytics module 115 to be applied to the appropriate tokens.

FIG. 7 is an example of metadata fields converted to annotations to be analyzed by a text analytics system, in accordance with an embodiment of the present invention.

In this exemplary embodiment, extracted tables are encoded into an intermediate format (e.g., XML or JSON) along with offset information of rows/columns/fields. The actual offset of the original cells would be stored with the table values as depicted in FIG. 4. The table encodes and annotates the table values. The encoded data is placed in metadata fields as depicted in conversion 705. During the text analytics processing stage, the metadata fields are converted to annotations to be available for text analytics. Table-related metadata would become annotation features in the target text analytics system. For example, for annotating the cell entry containing "Pan" associated with M4 in the table of FIG. 4, becomes encoded as conversion 705.

Figure 8:
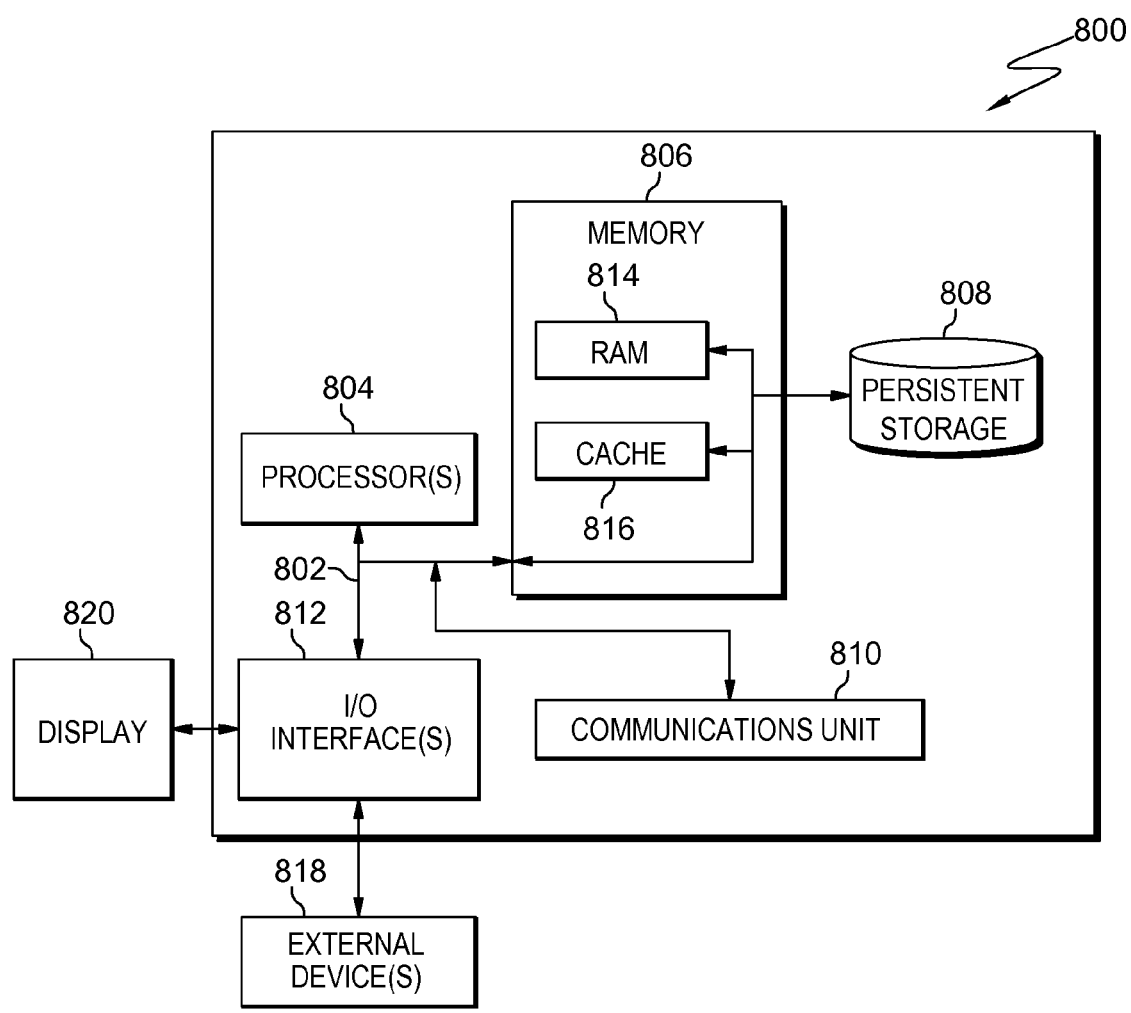
FIG. 8 depicts a block diagram of internal and external components of a computing device, in accordance with an embodiment of the present invention.

FIG. 8 depicts a block diagram of internal and external components of computer system 800, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

Computer system 800 includes communications fabric 802, which provides for communications between one or more processors 804, memory 806, persistent storage 808, communications unit 810, and one or more input/output (I/O) interfaces 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 814 and cache memory 816. In general, memory 806 can include any suitable volatile or non-volatile computer-readable storage media. Software (e.g., modeling program, travel optimization program, etc.) is stored in persistent storage 808 for execution and/or access by one or more of the respective processors 804 via one or more memories of memory 806.

Persistent storage 808 may include, for example, a plurality of magnetic hard disk drives. Alternatively, or in addition to magnetic hard disk drives, persistent storage 808 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 808 can also be removable. For example, a removable hard drive can be used for persistent storage 808. Other examples include optical and magnetic disks, thumb drives, and smart cards that are inserted into a drive for transfer onto another computer-readable storage medium that is also part of persistent storage 808.

Communications unit 810 provides for communications with other computer systems or devices via a network. In this exemplary embodiment, communications unit 810 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to a computing device through communications unit 810 (e.g., via the Internet, a local area network or other wide area network). From communications unit 810, the software and data can be loaded onto persistent storage 808.

One or more I/O interfaces 812 allow for input and output of data with other devices that may be connected to computer system 800. For example, I/O interface 812 can provide a connection to one or more external devices 818 such as a keyboard, computer mouse, touch screen, virtual keyboard, touch pad, pointing device, or other human interface devices. External devices 818 can also include portable computer-readable storage media such as, for example, thumb drives, portable optical or magnetic disks, and memory cards. I/O interface 812 also connects to display 820.

Display 820 provides a mechanism to display data to a user and can be, for example, a computer monitor. Display 820 can also be an incorporated display and may function as a touch screen, such as a built-in display of a tablet computer.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for extracting and annotating text, the method comprising the steps of:
   performing, by one or more processors, a copying operation on a first source;
   extracting, by one or more processors, text data from the copy operation, wherein the text data comprises a stream of characters in a first text format;
   applying, by one or more processors, heuristics to extracted text data from the first source, wherein the heuristics detect readability of the text data;
   encoding, by one or more processors, the text data into a second text format, wherein encoding the text data into the second text format maintains structures and elements of the text data;
   transforming, by one or more processors, the second text format into annotations with the first text format;
   performing, by one or more processors, a pasting operation on the transformed annotations in the first text format while maintaining a respective arrangement of the structure and elements of the first text format;
   responsive to transforming the second text format into the annotations with the first text format, resolving, by one or more processors, offsets into the first source to maintain a format, structure, and elements of the annotations within a matrix structure;
   applying, by one or more processors, validating analytics on the extracted text data, the annotations with the first text format, and search queries within the matrix structure, wherein the validating analytics comprise at least: delimitation and position logic;
   responsive to analyzing the search queries by applying the validation analytics, determining, by one or more processors, if the text data a line corresponds with a token header, wherein the line is contained within the matrix structure;
   determining, by one or more processors, character and feature correspondence, wherein a token on a first line has a same character and feature correspondence as another token on a second line; and
   utilizing, by one or more processors, the positional logic to identify missing values within the text data, as contained within the matrix structure.

2. The method of claim 1, wherein extracting text data from a first source wherein the text data comprises a steam of characters in a first text format, comprises at least one of:
   utilizing, by one or more processors, document application programming interfaces (APIs);
   utilizing, by one or more processors, public domain APIs; and
   utilizing, by one or more processors, optical character recognition (OCR).

3. The method of claim 1, wherein applying heuristics to the extracted text data from the first source, wherein the heuristics detect the readability of the text data, comprises:
   initiating, by one or more processors, a table readability algorithm;

searching, by one or more processors, for capitalized words and letters within the text data;

determining, by one or more processors, lack of triple data format within the text; and determining, by one or more processors, at least two contiguous lines with a same data format.

4. The method of claim 1, wherein encoding the text data into the second text format, further comprises:

adding, by one or more processors, the encoded text data in the second text format to the text data.

5. The method of claim 1, further comprising:

identifying, by one or more processors, missing elements in unstructured text data, as contained within the matrix structure; and aligning, by one or more processors, existing elements in the unstructured text data, as contained within the matrix structure, to be arranged using the position logic.

6. A computer program product for extracting and annotating text, the computer program product comprising:

a computer readable storage medium and program instructions stored on the computer readable storage medium, the program instructions comprising:

program instructions to perform a copying operation on a first source;

program instructions to extract text data from the copy operation, wherein the text data comprises a stream of characters in a first text format;

program instructions to apply heuristics to extracted text data from the first source, wherein the heuristics detect readability of the text data;

program instructions to encode the text data into a second text format, wherein the program instructions to encode the text data into the second text format maintain structures and elements of the text data;

program instructions to transform the second text format into annotations with the first text format;

program instructions to perform a pasting operation on the transformed annotations in the first text format while maintaining a respective arrangement of the structure and elements of the first text format;

responsive to program instructions to transform the second text format into the annotations with the first text format, program instructions to resolve offsets into the first source to maintain a format, structure, and elements of the annotations within a matrix structure;

program instructions to apply validating analytics on the extracted text data and the annotations with the first text format within the matrix structure, wherein the validating analytics comprise at least: delimitation and position logic;

responsive to program instructions to analyze the search queries by applying the validation analytics, program instructions to determine if the text data within a line corresponds with a token header, wherein the line is contained within the matrix structure;

program instructions to determine character and feature correspondence, wherein a token on a first line has the same character and feature correspondence as another token on a second line; and program instructions to utilize positional logic in order to identify missing values within the text data, as contained within the matrix structure.

7. The computer program product of claim 6, wherein program instructions to extract text data from a first source wherein the text data comprises a steam of characters in a first text format, comprise at least one of:

program instructions to utilize document APIs;
program instructions to utilize public domain APIs; and
program instructions to utilize OCR.

8. The computer program product of claim 6, wherein program instructions to apply heuristics to the extracted text data from the first source, wherein the heuristics detect the readability of text data, comprise:

program instructions to initiate a table readability algorithm;

program instructions to search for capitalized words and letters within the text data;

program instructions to determine lack of triple data format within the text; and program instructions to determine at least two contiguous lines with a same data format.

9. The computer program product of claim 6, wherein program instructions to encode the text data into the second text format, further comprise:

program instructions to add the encoded text data in the second text format to the text data.

10. The computer program product of claim 6, further comprising:

program instructions to identify missing elements in unstructured text data, as contained within the matrix structure; and program instructions to align existing elements in unstructured text data, as contained within the matrix structure, to be arranged using the position logic.

11. A computer system for extracting and annotating text, the computer system comprising:

one or more computer processors;

one or more computer readable storage media;

program instructions stored on the one or more computer readable storage media for execution by at least one of the one or more processors, the program instructions comprising:

program instructions to perform a copying operation on a first source;

program instructions to extract text data from the copy operation, wherein the text data comprises a stream of characters in a first text format;

program instructions to apply heuristics to extracted text data from the first source, wherein the heuristics detect readability of the text data;

program instructions to encode the text data into a second text format, wherein the program instructions to encode the text data into the second text format maintain structures and elements of the text data;

program instructions to transform the second text format into annotations with the first text format;

program instructions to perform a pasting operation on the transformed annotations in the first text format while maintaining a respective arrangement of the structure and elements of the first text format;

responsive to program instructions to transform the second text format into the annotations with the first text format, program instructions to resolve offsets into the first source to maintain a formation, structure, and elements of the annotations within a matrix structure;

program instructions to apply validating analytics on the extracted text data and the annotations with the first text format within the matrix structure, wherein the validating analytics comprise at least: delimitation and position logic;

responsive to program instructions to analyze the search queries by applying the validation analytics, program instructions to determine if the text data within a line corresponds with a token header, wherein the line is contained within the matrix structure;

program instructions to determine character and feature correspondence, wherein a token on a first line has the same character and feature correspondence as another token on a second line; and program instructions to utilize positional logic in order to identify missing values within the text data, as contained within the matrix structure.

12. The computer system of claim 11, wherein program instructions to extract text data from a first source wherein the text data comprises a steam of characters in a first text format, comprise at least one of:

program instructions to utilize document APIs;
program instructions to utilize public domain APIs; and
program instructions to utilize OCR.

13. The computer system of claim 11, wherein program instructions to apply heuristics to the extracted text data from the first source, wherein the heuristics detect the readability of text data, comprise:

program instructions to initiate a table readability algorithm;
program instructions to search for capitalized words and letters within the text data;
program instructions to determine lack of triple data format within the text; and
program instructions to determine at least two contiguous lines with the same format.

14. The computer system of claim 11, wherein program instructions to encode the text data into the second text format, further comprise:

program instructions to add the encoded text data in the second text format to the text data.

15. The computer system of claim 11, further comprising:

program instructions to identify missing elements in unstructured text data, as contained within the matrix structure; and program instructions to align existing elements in unstructured text data, as contained within the matrix structure, to be arranged using the position logic.

\* \* \* \* \*